United States Patent
Edström et al.

(10) Patent No.: US 12,239,153 B2
(45) Date of Patent: Mar. 4, 2025

(54) SWEETENING COMPOSITION AND METHOD OF MAKING AND USING SAME

(71) Applicant: BAYN SOLUTIONS AB, Stockholm (SE)

(72) Inventors: Patrik Edström, Höllviken (SE); Roger Aidoo, Gävle (SE)

(73) Assignee: Bayn Solutions AB, Stockholm (SE)

( * ) Notice: Subject to any disclaimer, the term of this patent is extended or adjusted under 35 U.S.C. 154(b) by 312 days.

(21) Appl. No.: 17/797,520

(22) PCT Filed: Feb. 5, 2021

(86) PCT No.: PCT/EP2021/052856
§ 371 (c)(1),
(2) Date: Aug. 4, 2022

(87) PCT Pub. No.: WO2021/156471
PCT Pub. Date: Aug. 12, 2021

(65) Prior Publication Data
US 2023/0067312 A1    Mar. 2, 2023

(30) Foreign Application Priority Data
Feb. 6, 2020   (SE) .................... 2050126-8

(51) Int. Cl.
A23L 27/30      (2016.01)
A23G 9/34       (2006.01)
A23L 33/26      (2016.01)

(52) U.S. Cl.
CPC ............ *A23L 27/34* (2016.08); *A23G 9/34* (2013.01); *A23L 33/26* (2016.08); *A23V 2002/00* (2013.01)

(58) Field of Classification Search
CPC ............ A23L 27/34; A23L 33/26; A23G 9/34
See application file for complete search history.

(56) References Cited

U.S. PATENT DOCUMENTS

| | | | |
|---|---|---|---|
| 2001/0002271 A1* | 5/2001 | Duffett ................. | C13B 50/004 426/103 |
| 2002/0001656 A1* | 1/2002 | Mason .................... | A23L 23/00 426/573 |
| 2008/0081093 A1 | 4/2008 | Ison et al. | |
| 2011/0027444 A1 | 2/2011 | Gelov | |
| 2011/0027446 A1 | 2/2011 | Gelov | |
| 2013/0209643 A1* | 8/2013 | Kruger .................... | A23L 29/35 426/658 |

(Continued)

FOREIGN PATENT DOCUMENTS

| | | |
|---|---|---|
| EP | 1 629 730 A1 | 3/2006 |
| JP | H03280857 A | 12/1991 |

(Continued)

OTHER PUBLICATIONS

International Search Report and Written Opinion for Application No. PCT/EP2021/052856, mailed May 19, 2021, 9 pages.

(Continued)

*Primary Examiner* — Anthony J Weier
(74) *Attorney, Agent, or Firm* — Julie K. Staple; Dinsmore & Shohl LLP

(57) ABSTRACT

There is provided a sweetening composition including particles, the particles including a high intensity sweetener, a non-sucrose bulk sweetener and a low digestible carbohydrate polymer.

12 Claims, 4 Drawing Sheets

(56) References Cited

U.S. PATENT DOCUMENTS

2017/0064988 A1    3/2017   Prakash

FOREIGN PATENT DOCUMENTS

| | | | |
|---|---|---|---|
| JP | H04287659 A | 10/1992 | |
| JP | 2002136270 A | 5/2002 | |
| WO | WO2011/143465 A1 | 11/2011 | |
| WO | 2015/116976 A1 | 8/2015 | |
| WO | WO2016/097069 A1 | 6/2016 | |
| WO | WO2018145072 * | 8/2018 | |
| WO | WO-2018145072 A1 * | 8/2018 | ........... A23G 3/0085 |
| WO | 2019/151951 A1 | 8/2019 | |

OTHER PUBLICATIONS

European Search Report for European Application No. 23171696.0, dated Oct. 4, 2023, 11 pages.
Reasons for Refusal for Japanese Patent Application No. 2022-547894, dated Dec. 20, 2024, 6 pages.

* cited by examiner

SWEETENING COMPOSITION AND METHOD OF MAKING AND USING SAME

CROSS REFERENCE TO RELATED APPLICATIONS

This application is a U.S. National Stage of international application PCT/EP2021/052856 filed Feb. 5, 2021, which claims priority to Swedish Application No: 2050126-8, filed Feb. 6, 2020. The entire content of both of these applications is incorporated herein by reference.

FIELD OF THE INVENTION

The present invention relates generally to a sweeting composition and a method for producing the same.

BACKGROUND

Sucrose is the most commonly used sweetening agent in the food industry. The high sugar content in most food products has led to the development of sucrose substitutes with fewer calories and with a low glycaemic index. However, sucrose substitutes generally mimic certain properties of sucrose, such as body, mouthfeel and texture, poorly. Moreover, such sucrose substitutes are often difficult to dose and to handle in food manufacturing.

WO2011/017140 provides information about a composition (Composition 1B) that comprises a blend (that is not agglomerated particles) of 90% xylitol and 9.32% Unidex. However, WO2011/017140 also clearly discloses that composition 1B is not useful ("oily, clumpy, poor").

SUMMARY OF INVENTION

In a first aspect of the invention there is provided a composition comprising particles, the particles comprising a high intensity sweetener, a non-sucrose bulk sweetener and a low digestible carbohydrate polymer.

The sweeting composition has a number of advantages.

The particle size of the composition can be made similar to that of conventional sucrose, which simplifies the adaption of current recipes, procedures and equipment.

The sweetening composition can be used in the production of various sweetened products, such as confectionery and ice cream. The sweetening composition can be used to replace sucrose. Sucrose can be replaced in an already established manufacturing process with the sweeting composition at a 1:1 ratio The homogeneous particle size and the fact that the composition is premixed and agglomerated makes is easy to dispense in bulk and prevents caking. The particles are of a uniform size and density which avoids phasing, i.e. that one compound has smaller particle size and is therefore not homogenously distributed when mixed with particles of a large size. The distribution of the high-intensity sweetener (HIS) in the product will be homogenous which will ensure even sweetness in the end product.

Low digestible carbohydrate polymers (LDCs) provide bulk in the composition and are also more slowly digested which results in a low calorie-product, reduced glucose response, increased satiety and a reduction in tooth decay (cavities). However, LDCs such as dextrin (see below) has low density, is "fluffy" and are difficult to mix homogenously and mixtures typically does not stay homogenous.

Hence LDCs are typically difficult to use in machinery. The inventive composition is much easier to handle in machinery.

Hence, by binding a non-sucrose bulk sweetener and a high-intensity sweetener to a low-digestible carbohydrate polymer a number of advantages are achieved.

Preferably at least 99% of the particles are smaller than 500 µm and at most 20% of the particles are smaller than 100 µm. This provides a particle size that is easy to use in machinery and which easily replaces sucrose.

In one embodiment the composition comprises from 0.01% to 1% by weight of high intensity sweetener, from 75% to 92% by weight of a non-sucrose bulk sweetener and from 5% to 22% by weight of a low digestible carbohydrate polymer.

In a preferred embodiment the non-sucrose bulk sweetener is present in an amount of from 85% to 90% by weight, the low digestible carbohydrate polymer is present in an amount of from 9% to 13% by weight and the high intensity sweetener is present in an amount of from 0.01% to 1% by weight.

For several reasons it is useful to keep the amount of fiber (LDC) in such a product as low as possible. Fiber products tend to be expensive.

Moreover, the inventors have found that fibers tend to break down into sugars when used in various food producing methods which results in release of sugar moieties from the fibers. This results in a higher sugar content in the final product than intended. This makes it difficult to estimate the amount of sugar in the final product. It is therefore useful to keep the amount of fiber as low as possible.

In one embodiment the non-sucrose bulk sweetener is present in an amount of from 86% to 90% by weight.

In a preferred embodiment the low digestible carbohydrate polymer is dextrin. The non-sucrose bulk sweetener may for example be maltitol or erythritol, and the low digestible carbohydrate polymer may preferably be dextrin.

The particles may consist of from 0.01% to 1% of a high intensity sweetener, from 5% to 22% by weight of a low digestible carbohydrate polymer the balance being a non-sucrose bulk sweetener.

The particles may consist of from 0.01% to 1% of a high intensity sweetener, from 9% to 13% by weight of a low digestible carbohydrate polymer, the balance being a non-sucrose bulk sweetener. Again, the low digestible carbohydrate polymer is preferably dextrin.

In a second aspect of the invention there is provided a particle comprising a high intensity sweetener, a non-sucrose bulk sweetener and a low digestible carbohydrate polymer. In a preferred embodiment the non-sucrose bulk sweetener is present in an amount of from 85% to 90% by weight, the low digestible carbohydrate polymer is present in an amount of from 9% to 13% by weight and the high intensity sweetener is present in an amount of from 0.01% to 1% by weight in the particle.

In one embodiment, the non-sucrose bulk sweetener is present in an amount of from 86% to 90% by weight.

In a third aspect there is provided a method of manufacturing a sweetening composition comprising the steps of:
  a) mixing a high intensity sweetener with water, and
  b) mixing a non-sucrose bulk sweetener (for example particles comprising a non-sucrose bulk sweetener) with a low digestible carbohydrate polymer (for example particles comprising a low-digestible carbohydrate polymer), to form a powder, then
  c) mixing the mixture from step a) with the powder from step b) and d) drying the mixture to allow the high intensity sweetener, the digestible carbohydrate polymer and the non-sucrose bulk sweetener to form particles.

It is preferred that the water-high intensity sweetener mixture does not contain low digestible carbohydrate polymer or a non-sucrose bulk sweetener. Fluid bed drying is a preferred method of producing the particles and the composition.

In a fourth aspect there is provided a composition obtainable with the method according to the third aspect of the invention.

In a fifth aspect there is provided a particle obtainable with the method according to the third aspect of the invention.

There is also provided a method for manufacturing a sweetened product, comprising the steps of replacing sucrose in a recipe with the inventive composition at a ratio of 1:1.

DESCRIPTION OF DRAWINGS

The accompanying drawings form a part of the specification and schematically illustrate preferred embodiments of the invention and serve to illustrate the principles of the invention.

DETAILED DESCRIPTION

Figure 1:
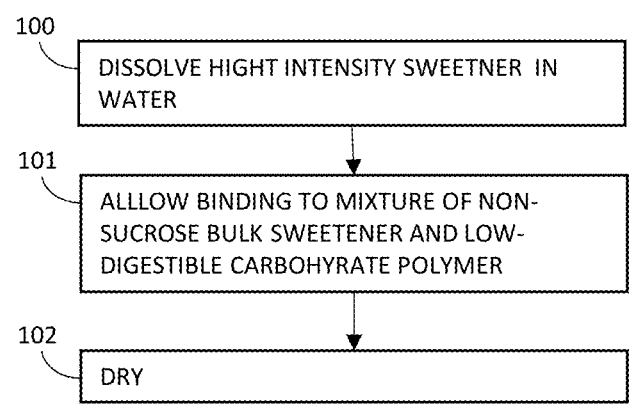
FIG. 1 is a flowchart of a method.

Percentages are stated as weight/weight herein.

Particle size herein refers to particle size determined by using a plurality of sieves with different cut-offs, such as sieve from Retsch (www.retsch.com). The material is sieved starting with the sieve with the largest openings, and proceeds to the sieves with smaller openings. The reminder of material in each sieve is weighted, and the weight percentages of each fraction is determined. Suitable cut-offs for the sieves may be for example 100 μm, 200 μm, 300 μm, 400 μm and 500 μm.

The composition comprises particles that comprise of a high intensity sweetener, a non-sucrose bulk sweetener and a low digestible carbohydrate polymer in an agglomerated form.

The composition comprises a high intensity sweetener (HIS). High intensity sweeteners (or high potency sweeteners) are hundreds to thousands of times sweeter than sucrose. There are many different useful high intensity sweeteners. The HIS in the composition is preferably a HIS that is approved for use in food. Useful HIS include stevia sweeteners (stevia glycosides), aspartame, acesulfame-K, thaumatin, saccharin, sucralose and neotame, or mixtures of these. Rebaudioside A and rebaudioside M are a preferred stevia sweeteners. Rebaudioside A is approximately 200 to 300 times as sweet as sucrose. Other useful HIS include steviobioside, rebaudioside B, C, D, E, F and M and dulcoside, as well as high intensity sweeteners extracted from the monk fruit.

The concentration of the HIS in the final product may be from 0.01% to 1.5%, more preferably from 0.01%-1%, more preferably from 0.02% to 0.5%, in particular 0.02% to 0.2% and most preferred 0.02% to 0.08%. The concentration is selected based on the intensity of the HIS and the concentration and sweetness of the non-sucrose bulk sweetener that is used.

The composition comprises a non-sucrose bulk sweetener. The non-sucrose bulk sweetener is preferably incompletely digested and/or poorly absorbed by the body. The non-sucrose bulk sweetener preferably has a low caloric value, preferably a caloric value that is lower than that of sucrose, which is 4 kcal/g. The caloric value may be for example less than 3 kcal/g, more preferably less than 2.5 kcal/g. Maltitol has a caloric value of 2.1 kcal/g.

The non-sucrose bulk sweetener may be an ingredient that can substitute for both the physical bulk and sweetness of sucrose. It also provides texture, to achieve a suitable mouth feel when the end product is consumed.

Examples of suitable non-sucrose bulk sweeteners include allulose, polyols, tagatoses, trehaloses and isomultuloses, where polyols are preferred. The polyol is preferably a sugar alcohol. Sugar alcohols are commonly obtained by hydrogenation of sugars.

Suitable sugar alcohols include maltitol, sorbitol, isomalt, erythritol, lactitol, mannitol and xylitol, or mixtures of these, where maltitol, erythritol, sorbitol, isomalt and xylitol are preferred. Polyols vary in sweetness from half as sweet to about as sweet as sucrose. Hence the relative sweetness in relation to sucrose may be from 0.5 to 1.

Allulose is also a preferred non-sucrose bulk sweetener.

The concentration of non-sucrose bulk sweetener in the composition may be from 50-95%, more preferably 70-92%, in particular from 85% to 91%, or 85-90% and even more preferably 86% (or 86.5%) to 89%.

The composition includes a low-digestible carbohydrate polymer (LDC). LDCs typically are fiber or fiber-like ingredients. They are polymers consisting of monomer units which may include or consist of glucose or fructose chains with 1,6-glycosidic or β 2→1 linkage. The polymers may be branched or linear with degree of polymerizations ranging between 3 and 60. The average molecular weight of the LDC, in particular dextrin, may be from 1000 Daltons to 10 000 Daltons more preferably from 3000 Daltons to 6000 Daltons, more preferably from 4000 Daltons to 5000 Daltons. It is preferred that the LDC is a resistant to degradation during digestion to at least some extent.

Examples of useful LDCs include polydextrose, inulin, oligofructose and dextrin, or mixtures of these. Dextrin is a preferred LDC, because it has a neutral taste and is stable at a wide range of pH values.

The concentration of low digestible carbohydrate polymer in the composition, for example dextrin, may be 5-22%, more preferably 9-14%, in particular 9-13%, even more preferred 10%-13% and most preferably 11% to −13%. The concentration of low digestible carbohydrate polymer may also be from 5% to 8%.

In one embodiment the composition comprises 50%-95%, more preferably 75%-92%, in particular 85-90% maltitol, and 5-22%, more preferably 9-14%, in particular 9-13% dextrin and a high intensity sweetener.

The composition may additionally comprise other suitable and food-compatible components. Examples of such agents are flavouring agents, sweetness enhancers, and flavour modifiers. Examples of such components are yeast extract and antioxidants. Such components are typically present in less than 1%. The composition may also comprise emulsifier, a stabiliser or a hydrocolloid. Any suitable concentration may be used, but preferably the concentration is from 0.1 to 3%.

In one embodiment the composition consists of 5-22%, more preferably 9-14%, in particular 9-13%, even more preferred from 10% to 13% and most preferably from 11% to 13% of a LDC which preferably is dextrin, from 0.01%-

1% of a HIS, and optionally up to 3% of a sweetness enhancer, a flavour modifier, an emulsifier, a stabiliser or a hydrocolloid, the balance being a non-sucrose bulk sweetener. The composition preferably consists of particles which, on average, has this composition.

The composition may also comprise trace amounts of impurities.

The combined concentration of low digestible carbohydrate polymer and non-sucrose bulk sweetener may be at least 97%, more preferably at least 98% and most preferably at least 99%.

The sweetness of the composition can be adjusted by selecting the amounts of the selected HIS and the selected non-sucrose bulk sweetener. The final sweetness may be close or identical to that of sucrose. Sweetness may be determined by using a panel of persons as is known in the art.

The composition is preferably in the form of a powder. The composition is preferably dry. Moisture of the composition is preferably less than 2%. The moisture content of the product is preferably less than 1%, more preferably 0.2-0.5%.

The composition and the various components are preferably edible and/or suitable or at least acceptable for human consumption. The composition can be used as a sucrose substitute. In one aspect of the invention, sucrose in a recipe and/or procedure is replaced with the same quantity of the composition. This provides for easy adaptation of sucrose-containing recipes. The composition may be used as sweetener in various solid food products such as baked goods, confectionary, ice cream or similar. It may also be used to sweeten dairy products such as ice cream, yogurt, cheese curd and puddings. It may also be used to sweeten jams and chocolate spread. In one embodiment the composition is used to sweeten a product that is not a beverage. In a preferred embodiment the composition is used as sweetener in ice cream.

The composition preferably comprises particles comprising the high intensity sweetener, the non-sucrose bulk sweetener and the low digestible carbohydrate polymer. Hence, the particles of the composition are preferably agglomerates that comprise non-sucrose bulk sweetener, LDC and HIS in one and the same particle. For example, the high intensity sweetener may bind the particles of low-digestible carbohydrate polymer and the particles of non-sucrose bulk sweetener to each other, to form a larger particle.

Or, low digestible carbohydrate polymer particles may be partially or wholly coated with the non-sucrose bulk sweetener and the high intensity sweetener. The non-sucrose bulk sweetener may partially penetrate into particles of LDC.

In one embodiment there are separate particles comprising the low digestible carbohydrate polymer and the non-sucrose bulk sweetener where one or both of them are coated or partially coated with the high intensity sweetener. The high intensity sweetener may partially or wholly coat or otherwise adhere to particles of low digestible carbohydrate polymer and/or the particles of non-sucrose bulk sweetener.

The binding or coating in the particles may be mediated with any type of suitable chemical or physical bond such as covalent bond or a van der Waals bond.

The particle size is preferably similar to that of sucrose. An upper limit of the particle size may be 1000 µm, such that 99% or 100% of the particles or more are smaller than 1000 µm, more preferably smaller than 500 µm. Preferably more than 70%, more preferably more than 80%, and most preferably more than 90% of the particles are larger than 100 µm. The particle size may be adjusted by selecting appropriate particle size of the non-sucrose bulk sweetener and the LDC as the starting material.

The composition is preferably obtained by a method comprising mixing particles of the non-sucrose bulk sweetener and the LDC and exposing them to a water solution comprising the high-intensity sweetener, in a manner such that high intensity sweetener binds to the LDC and the non-sucrose bulk sweetener particles, and preferably so that the non-sucrose bulk sweetener particles and the LDC particles bind to each other, to form agglomerates.

The concentration of high intensity sweetener in the water may be from 5-30%, in particular from 20-25%, in particular when there the high-intensity sweetener is a stevia sweetener. The binding may occur under conditions where the non-sucrose bulk sweetener or the LDC particles does not dissolve in the water. The conditions for binding are selected to obtain the desired final concentration of HIS, for example to apply the desired amount of HIS in the final particle, which in turn depends on the sweetness of the selected HIS.

The method may include a drying step. When fluid bed drying is used, no extra drying step is necessary. The method may comprise the step of breaking the particles to a suitable particle size, for example by milling. This may be carried out after binding and drying. This is typically not needed when a fluid bed dryer is used.

With reference to FIG. 1, in step 100 high intensity sweetener is dissolved in water. Hence preferably a mixture that comprises high intensity sweetener and water and not non-sucrose bulk sweetener or LDC is obtained. The mixture may consist of high intensity sweetener and water. Separately, the LDC in powder form is mixed with the non-sucrose bulk sweetener in powder form.

In step 101 the high intensity sweetener is allowed to bind to the mixture of particles of non-sucrose bulk sweetener and LDC. Preferably the water-HIS mixture is sprayed on the particles of non-sucrose bulk sweetener and LDC, preferably while the particles are being vibrated or agitated and preferably also heated. The resulting mixture is dried in step 102. Steps 101 and 102 can be carried out using a fluid bed dryer, see below. Hence step 101 and 102 may be carried out in one continuous process.

Any vessel with spray-nozzles, vibration/agitation, capacity for heating and where the material preferably can flow from one end to the other can be used. Suitable temperatures are those used for fluid bed drying (below). Useful technologies include fluid bed drying, spray drying and wet granulation. The final product is preferably a free flowing and homogeneous powder.

Figure 2:
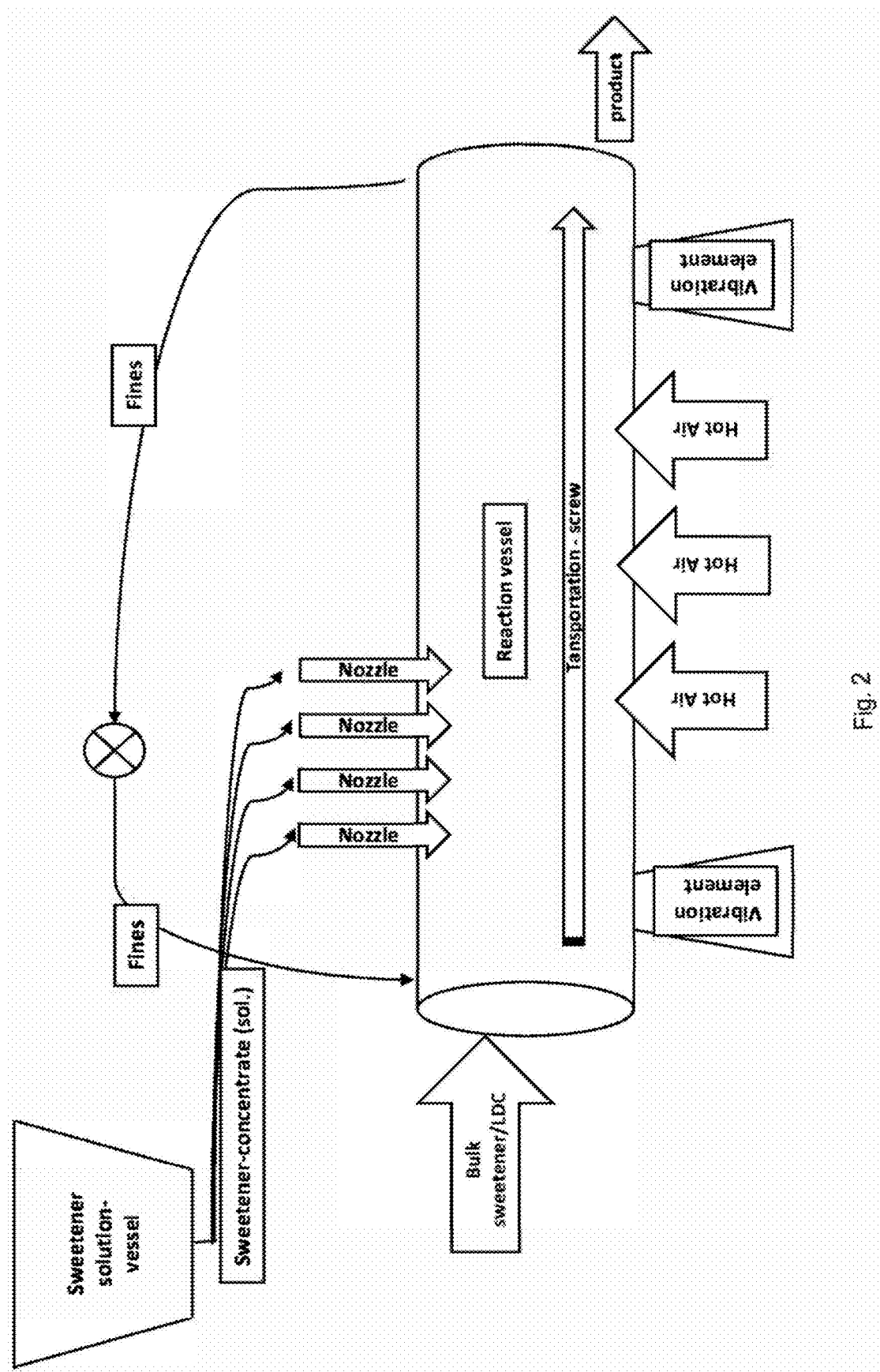
FIG. 2 is a schematic drawing of a fluid bed dryer.

In a preferred method fluid bed drying is used for steps 101 and 102. An example of a fluid bed chamber dryer is shown in FIG. 2. The mixture of non-sucrose bulk sweetener and LDS is fluidised and sprayed with the water solution comprising the HIS. The fluid bed dryer chamber of FIG. 2 comprises nozzles for spraying water-HIS mixture onto the fluid bed that holds the bulk-sweetener/LDC particles. The bed is maintained by hot air injected from below. Formation of the particles occurs in the bed as HIS/water is sprayed. The fluid bed drier may also be used to adjust final particle size. Particles that are too small are recirculated. The fluid bed drier may also have a sieve for removing particles that are too large. The fluid bed drier may provide vibration in the chamber. A suitable fluid bed dryer is VIBRO-FLUID-IZER™ Fluid Bed from GEA Group Aktiengesellschaft. from F. H. SCHULE Mühlenbau GmbH.

When a fluid bed drier is used a preferred temperature in the chamber is 80° C. to −120° C., more preferably 90°

C.-100° C. and most preferred 90° C.-95° C. The temperature in the hot air source may be higher. The non-sucrose bulk sweetener and the LDS may enter the fluid bed drier at ambient temp.

While the invention has been described with reference to specific exemplary embodiments, the description is in general only intended to illustrate the inventive concept and should not be taken as limiting the scope of the invention. The invention is generally defined by the claims.

Example 1

Stevia glucosides rebaudioside A (97% purity) was mixed with water to obtain a solution containing 22.8% stevia. Maltitol powder (particles size 200 um) and dextrin powder was mixed to obtain a powder mixture, which was fed into a fluid bed drier. Air temp in the chamber was 90-95° C. Drying process was about two minutes. The batch size was 400 kg.

The final composition of the product was as follows:
Maltitol (87.15%)
Dextrin (12.73%)
Steviol glycosides (0.12%)
The result was a free flowing and homogenous powder.

Example 2

The particle size of the composition was determined using sieves. The final particle size distribution was as follows:

| | |
|---|---|
| >400 μm | 7% |
| 300 μ-400 μm | 11% |
| 200 μm-300 μm | 42% |
| 100 μm-200 μm | 30% |
| <100 μm | 10% |

90% of particles were larger than 100 um. All particles were smaller than 500 um.

Example 3

Figure 3:
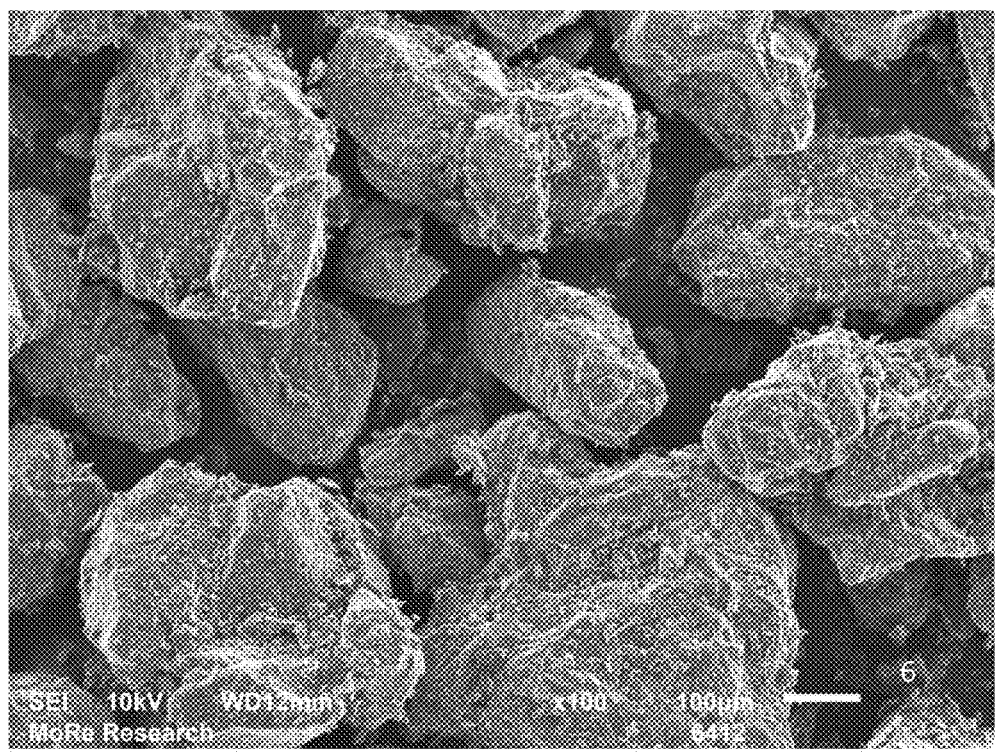
FIGS. 3, 4, 5, and 6 are electron microscopy images.
Figure 4:
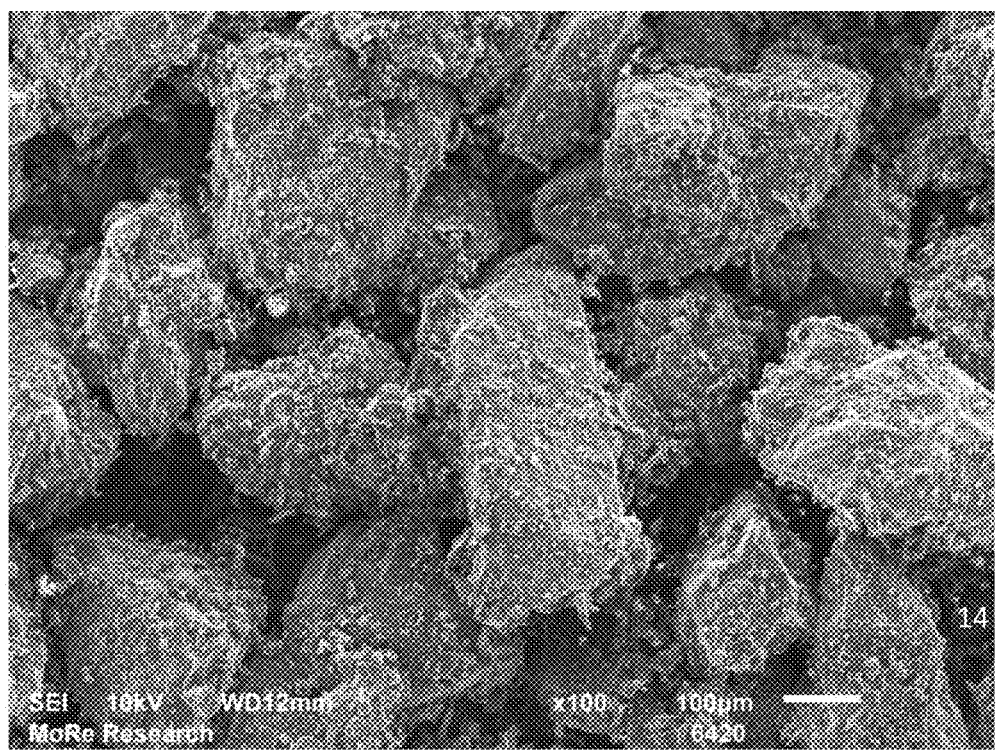
Figure 5:
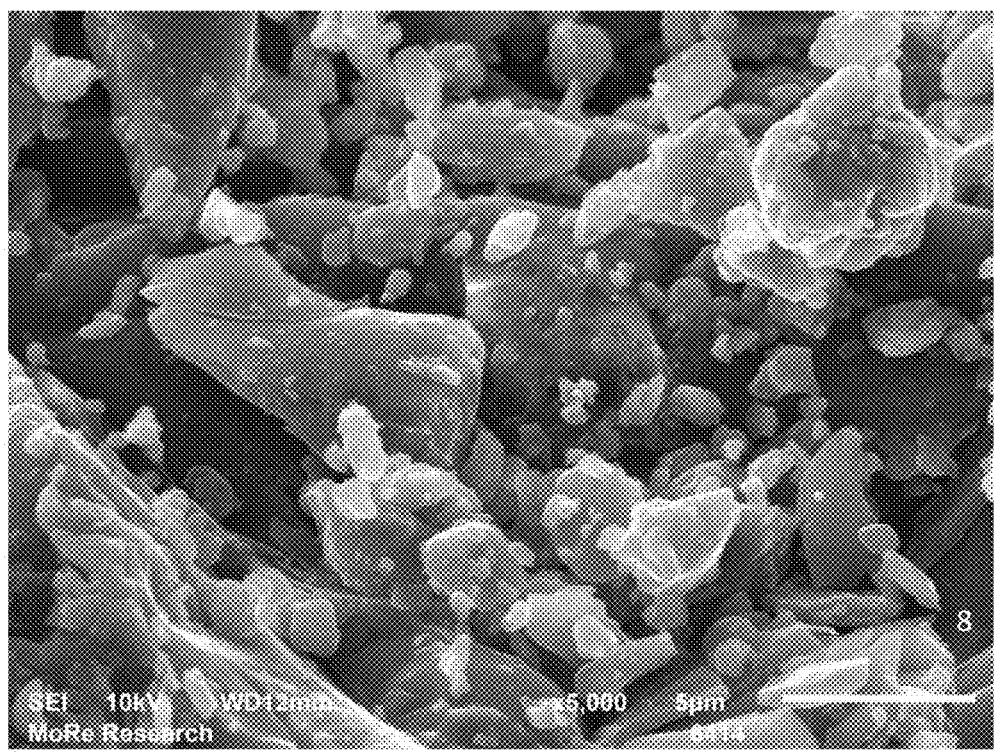
Figure 6:
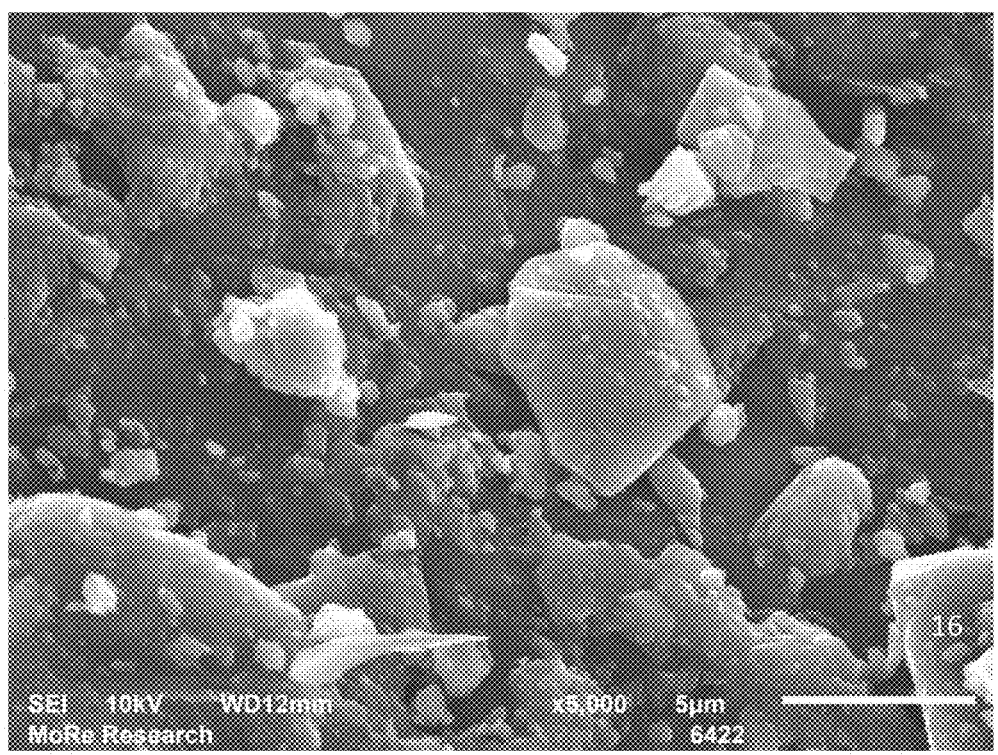

Electron microscopy was carried out on the mixture of maltitol and dextrin and the final product. FIG. 4 (final result) compared with FIG. 3 (starting material mixture of LDC and non-sucrose bulk sweetener) indicates that coating and agglomeration has taken place and shows a more homogenous particle size. FIG. 5 (starting material) compared with FIG. 6 (final result) indicates that coating and agglomeration has taken place.

Example 4

The composition was tested in various aspects. The composition behaved like sucrose. It was a free flowing powder and was easy to use in machinery. The composition did not dust and was easy to mix with other components and was freely soluble in water. The sweetness was about the same as for sucrose. The composition was used to sweeten a composition for ice cream with excellent results. The composition had the same mouthfeel as sucrose.

Example 5

Litesse ultrabulking (54.45%)
Erythritol (45.37%)
Navia Reb M 80 (0.18%)

Particles was formed essentially as described as in example 1.

Example 6

The composition of Example 5 was tested in various aspects. The composition behaved like sucrose. It was free flowing powder and was easy to use in machinery. The composition did not dust and was easy to mix with other components and was freely soluble in water. The sweetness was about the same as for sucrose.

The invention claimed is:

1. A composition consisting of particles, the particles each comprising a high intensity sweetener, a non-sucrose bulk sweetener and a low digestible carbohydrate polymer, the particles being agglomerates of said components in one and the same particle, where the non-sucrose bulk sweetener is present in an amount of from 85% to 90% by weight, where the low digestible carbohydrate polymer is present in an amount of from 9% to 13% by weight and the high intensity sweetener is present in an amount of from 0.01% to 1% by weight, where the non-sucrose bulk sweetener is a polyol and where the low digestible carbohydrate polymer is selected from the group consisting of polydextrose, inulin, oligofructose and dextrin.

2. The composition of claim 1 where the polyol is present in an amount of from 86% to 90% by weight.

3. The composition of claim 1 where at least 99% of the particles are smaller than 500 μm and at most 20% of the particles are smaller than 100 μm.

4. The composition according to claim 1 where the particles consist of from 0.01% to 1% of a high intensity sweetener, from 9% to 13% by weight of a low digestible carbohydrate polymer; the balance being a non-sucrose bulk sweetener.

5. The composition according to claim 4, where the low digestible carbohydrate polymer is dextrin.

6. A method of manufacturing a sweetening composition according to claim 1, comprising the steps of
 a) Mixing a high intensity sweetener with water to obtain a water-high intensity sweetener mixture comprising from 5% to 30% high intensity sweetener, that does not contain low digestible carbohydrate polymer or a non-sucrose bulk sweetener, and
 b) mixing non-sucrose bulk sweetener, said non-sucrose bulk sweetener being a polyol, with a low digestible carbohydrate polymer, to form a powder, then
 c) mixing the mixture from step a) with the powder from step b) and
 d) drying the mixture to allow the high intensity sweetener, the digestible carbohydrate polymer and the polyol to form particles.

7. The method of claim 6 where step c) and d) involves using fluid bed drying.

8. The method of claim 7 where the fluid bed dryer has a chamber and the temperature in the chamber is from 80° C. to 120° C.

9. Use of a composition according to claim 1 as a sweetener in ice cream.

10. A food product comprising a composition according to claim 1.

11. The food product of claim 10, wherein the food product is ice cream.

12. A method of sweetening a food product, comprising: including a composition according to claim 1 in preparation of the food product.

\* \* \* \* \*